United States Patent [19]

French

[11] Patent Number: 5,428,679
[45] Date of Patent: Jun. 27, 1995

[54] AUTOMATED SERVICE ASSURANCE METHOD AND SYSTEM

[75] Inventor: Phil H. French, Howard County, Md.

[73] Assignee: C&P of Maryland, Arlington, Va.

[21] Appl. No.: 35,769

[22] Filed: Mar. 23, 1993

[51] Int. Cl.[6] .............................................. H04M 3/42
[52] U.S. Cl. ..................................... 379/201; 379/67; 379/207
[58] Field of Search ..................... 379/67, 84, 88, 89, 379/12, 34, 112, 122, 136, 201, 207, 101

[56] References Cited

U.S. PATENT DOCUMENTS

| | | | |
|---|---|---|---|
| 4,736,405 | 4/1988 | Akiyama | 379/89 |
| 4,785,408 | 11/1988 | Britton et al. | 379/88 |
| 4,922,514 | 5/1990 | Bergeron et al. | 379/6 |
| 4,943,995 | 7/1990 | Daudelin et al. | 379/112 |
| 4,972,461 | 11/1990 | Brown et al. | 379/67 |
| 4,993,062 | 2/1991 | Dula et al. | 379/88 |
| 5,012,511 | 4/1991 | Hanle et al. | 379/201 |
| 5,060,255 | 10/1991 | Brown | 379/201 |
| 5,222,120 | 6/1993 | McLeod et al. | 379/207 |
| 5,222,125 | 6/1993 | Creswell et al. | 379/201 |
| 5,241,588 | 8/1993 | Babson, III et al. | 379/201 |
| 5,347,564 | 9/1994 | Davis et al. | 379/207 |

OTHER PUBLICATIONS

"Engineering and Operations in the Bell System", Second Edition, Bell Telephone Laboratories, 1983, ISBN 0-937764-04-5, pp. 823-828, Table 10-2.

*Primary Examiner*—James L. Dwyer
*Assistant Examiner*—Scott L. Weaver
*Attorney, Agent, or Firm*—Lowe, Price, LeBlanc & Becker

[57] ABSTRACT

A switched telecommunications system including voice messaging and also including an interactive voice processor (IVP) connectable to subscriber lines, a LAN connected via one data network to switches in the system and to operating components for effecting the voice messaging associated therewith and to a second business functions data network, an adjunct processor connected to receive data representative of special services ordered by subscribers and also connected to the IVP and LAN, a control processor connected to the LAN for accessing the first and second data networks and associated databases, where the adjunct processor is responsive to data representative of the special services ordered and provides input signals to the IVP and LAN, the IVP being responsive to signals from the second adjunct processor initiating connection to the service requesting subscriber line to deliver a voice message confirmation of the installation of the service, and wherein the control processor accesses and displays data representative of the service ordered and signals representative of that service delivered to the switches and voice messaging components, where the control processor has an input terminal for input effective to change the data provided to the switches and voice messaging components.

21 Claims, 4 Drawing Sheets

AUTOMATED SERVICE ASSURANCE METHOD AND SYSTEM

TECHNICAL FIELD

The present invention is directed to a switched telephone communications system used for providing general communications and handling stored messages and more particularly to an operational support system to provide users with timely information concerning the activation of new services and features as well as providing prompt and convenient repair or maintenance with follow-up status information regarding correction of problems.

BACKGROUND ART

In the operation of Public Switched Telecommunications Networks (PSTNs) Recent Change Memory Administration Centers (RCMACs) take service orders from business offices in response to customer calls and populate those service orders with the services requested by customers. Errors or delay in this processing result in customer complaints. One of the problems with the installation and activation of new services is the fact that the service must be activated both at the switch and also at a separate multi-services platform used to implement the service. This increases the possibility of error. While an older Central Office Verification System (COVS) has been available to aid in this process, that system has proven to have numerous shortcomings in the current multi-functional, many faceted service environment. Prior patents describe systems and methods to purportedly deal with generally related aspects of the overall problems.

U.S. Pat. No. 4,736,405 issued Apr. 5, 1988, to Tadahiko Akiyama deals with the problem of the proliferation of new telephone services such as speed dialing, call forwarding, etc., and the problem of familiarizing users with the methodology for using such services. The patent describes a proposed system for overcoming this difficulty by providing a switching system for identifying the kind of service requested by the user and then teaching the user through voice message the operating procedure including the sequence of operations in a step by step interactive manner even in the case where the user has no preliminary knowledge regarding the operations. The system provides sentences, clauses and words to guide the user through a procedure. Such information is stored in a voice data file that furnishes a voice synthesized speech to the user.

U.S. Pat. No. 4,785,408 issued Nov. 15, 1988, to James T. Britton et al. pertains to a touch tone telephone that can access business computer systems for a variety of customer services. This requires that an engineered dialogue be created to control the interaction of the end user and the system. Each dialogue content must be custom-designed. The patent describes a method wherein the system designer can create various systems for interactive voice service. This is achieved by having the designer select interaction modules from a group of predefined interaction modules, each module defining one of the possible functions which can be performed by the system and sets for the specific method for interconnecting these modules. These modules control the intercommunication between the various voice services and the selection of two or more of these modules implement the desired dialogue program. The architecture of the system is shown in FIG. 1 which includes the dialogue information. FIGS. 2-24 constitute flow charts that depict the process in selecting the modules to provide the voice dialogue information.

U.S. Pat. No. 4,993,062 issued Feb. 12, 1991, to Eric S. Dula et al., pertains to a system to provide a control capable of disconnecting and connecting multiple telephone lines to central office telephone equipment at predetermined times. The control system includes monitoring circuitry for monitoring the telephone line to identify predetermined signals. Circuitry is provided for generating voice messages for transmission on the telephone line such as notifying the user of the amount of time left on the call and for storing call information including user identification. FIG. 1 shows the architecture of the system. The operation of the system is shown in the flow chart FIGS. 2-4.

U.S. Pat. No. 4,922,514 issued May 1, 1990, to Lawrence E. Bergeron, et al., specifically deals with the dispatch of resources such as service engineers to remote sites. The system and method of the patent deal with the identification of locations requiring the resources, the proper selection of resources for assignment to the identified locations, and communication of the assignment to the selected resources. A typical example is stated to be a dispatcher for a radio-dispatched taxi fleet. The system includes apparatus for receiving alarm signals, preferably over the telephone network, from remote sites and a database of resources designated for each of the sites. The database is defined as a memory device, such as a random access memory, hard disk, etc., for storing information relating to a particular subject. The system also includes a controller which identifies a particular site in response to an alarm signal from that site, accesses the database to determine an ordered list of resources (engineers) designated for that site, sequentially attempts to establish in the listed order, communications with the resources designated for the site, and cyclically continues to attempt to establish communications until communications are established with one of the resources designated for the identified site, or until the occurrence of some other predetermined event.

DISCLOSURE OF THE INVENTION

It is an object of the present invention to provide an automated method and operational support system to provide highly flexible, mechanized real time verification of ordered services requiring activation in multiple switches or processors. This directly benefits the customers by helping to insure that ordered services and features are delivered promptly and accurately. The system further provides for prompt and convenient correction of errors and automatic maintenance confirmation to insure that any reported problems have been remedied.

It is a further object of the invention to provide a new and improved and Advanced Service Assurance Voice Platform (ASAVP) and methodology as a new support system using Interactive Voice Response (IVR) technology to keep customers informed as services and features are activated on their lines.

It is another object of the present invention to provide such a system which notifies customers as features are activated, provides educational information on the operation of the features, and provides for on-line transfers to live operator assistance at a Service Solution Center (SSC) as well as transfer to a sales center for the customer to arrange for still additional services.

These objects may be effected in a switched telecommunications system having an adjunct processor for effecting voice messaging services through the use of an Interactive Voice Processor (IVP). This is connectable to the switches of such system and to subscriber lines connected thereto. A Local Area Network (LAN) is connected via a first data network to such switches and via the adjunct processor to a second business functions data network. A second adjunct processor is connected to receive data representative of special services ordered by subscribers and also connected to the IVP and LAN. A control processor is connected to the LAN for accessing the first and second data networks and databases connected thereto, wherein the second adjunct processor is responsive to data representative of the special services ordered and provides input signals to the IVP and to the LAN, the IVP responsive to signals from the second adjunct processor initiates connection to the subscriber line to receive the ordered special services and delivers thereto a voice message confirmation of the installation of the service. Further, the control processor accesses and displays data representative of the service ordered and the signals representative of that service delivered to the switches and adjunct processor, with such control processor having an input terminal for receiving input effective to change the data provided to the switches and adjunct processor.

BEST MODE FOR CARRYING OUT THE INVENTION

Figure 1:
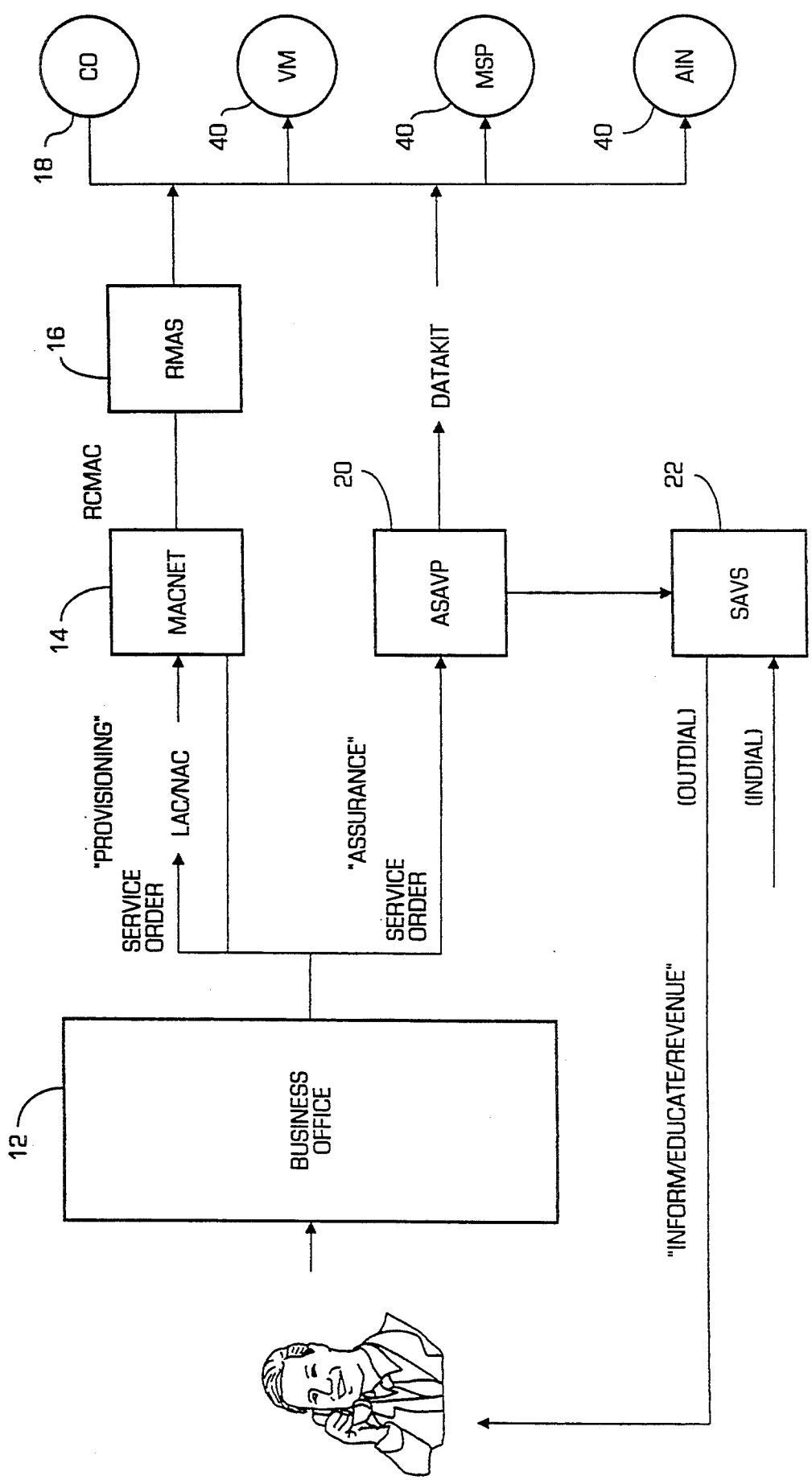
FIG. 1 is a diagrammatic illustration of the provisioning, assurance, information, education and revenue handling features of the invention.
Figure 2:
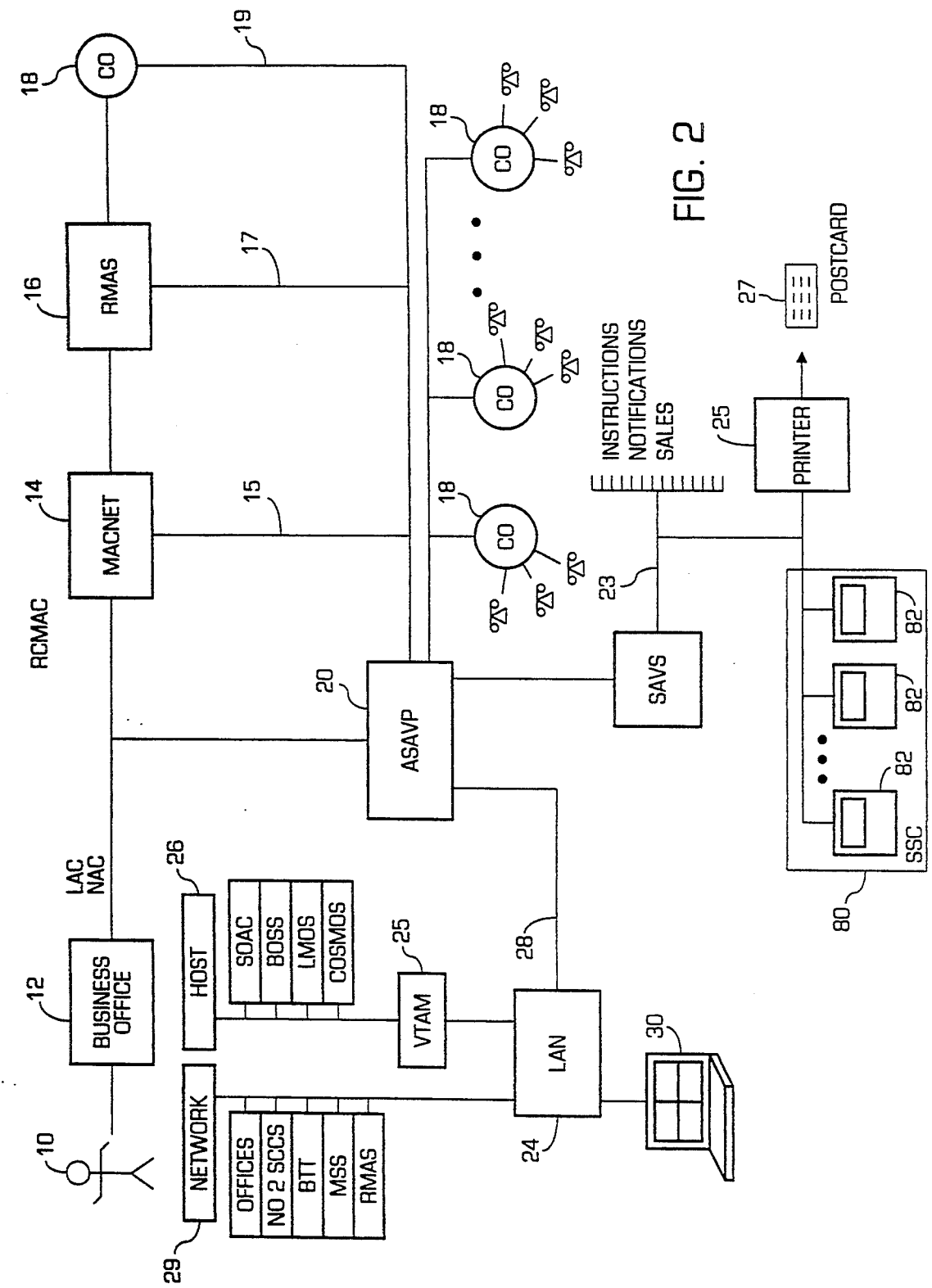
FIG. 2 is a block diagram illustration of the system utilized in the invention.

According to the preferred embodiment of the invention the Advanced Service Assurance Verification Platform (ASAVP) in conjunction with a Service Assurance Voice System (SAVS) is connected to multiple data networks in the existing Public Switched Telecommunications Network (PSTN) to efficiently effectuate correct installation, activation and customer satisfaction with the new service. The architecture of the proposed system is illustrated in FIGS. 1 and 2. The ASAVP system includes the functions of the existing Central Office Verification System (COVS), which may be, by way of example, a product marketed by CSC/Intellicom, formerly Intellicom of Englewood, Col. The Recent Change Memory Administration Center (RCMAC) takes service orders from the business office as customers call in and populates those service orders with the services requested by the customers and sends this downstream over a service order network to the RCMAC where the RMAS implements the recent change software for provisioning the services in the switch. Similar provisioning data is then fed to the multi-services platform switch, such as the switch and platform used to provide voice messaging services. The provisioning in the two switches may be in either of the two possible sequences depending upon the service involved as will be understood by those skilled in the art.

The COVS system and the improved ASAVP system receives from the business office via the data network, such as the Datakit Network, a copy of the service order and strips away the desired installation information from that order. On the designated installation date the installation data or information is inputted to the existing Public Switched Telephone Network (PSTN) data network here called the Datakit Network. The Datakit Network is a high speed data network used primarily to maintain switches. It permits gaining access to switches from remote locations for provisioning and maintenance. This information in the Datakit Network initiates dialing into the Central Office (CO) switch and to a multi-purpose platform switch to ascertain whether or not the ordered service has been installed. The ASAVP processor system performs multiple verifications at the CO switch as well as at the multi-services platform, using the existing Datakit Network.

Referring to FIGS. 1 and 2, particularly FIG. 2, a customer at 10 calls into the Business Office (BO) 12 and may order a new service such as, for example, Call Waiting. With same day service an order is issued within a few minutes of the call and that order is processed automatically through service provisioning and sub-systems and processors including MACNET and RMAS shown at 14 and 16. These sub-systems and processors program the stored program controlled switch 18 to put Call Waiting on the customer's line. The MACNET, RMAS and switch are all connected to the Datakit Network as is conventional and as indicated at 15, 17 and 19. At the same time that the foregoing occurs, a copy of the order is sent to the ASAVP processor 20.

By way of example, if an order is issued on Wednesday for installation on Friday it is sent to the MACNET. MACNET loads it into RMAS and it is held in RMAS until early in the morning on Friday, perhaps 2 a.m. At 2 a.m. the information is released and installed into the switch. The ASAVP processor gets the same order information, strips off the necessary data, and holds it in the database. If the installation is set for 2 a.m. the ASAVP processor will hold it for a pre-determined time before it tests for verification.

Thus the ASAVP processor may wait for four hours to make certain that the new service is on line and then queries the switch over the Datakit Network 19 to ensure that the installation was made. The ASAVP processor takes this information regarding the customer's telephone number and the service installed and sends it to the Service Assurance Voice System (SAVS) processor 22. The Service Assurance Voice System processor may be a CSC/Intellicom product or the like providing Integrated Voice Response (IVR) functions which are, by itself, known and provided by processors sometimes called Voice Processing Units (VPUs). The SAVS platform calls the customer and waits for an utterance. Upon detecting an utterance such as "Hello" it delivers a programmed message such as "The Call Waiting that you ordered from C&P Telephone Company has now been activated on your line." It may repeat this announcement 3 times. This constitutes a verification to the customer that their newly ordered service is installed, that is, service provisioning verification.

According to the invention the SAVS platform then continues the announcement in the following manner: "If you would like instructions on how to use Call Waiting, push 1. If you would like information on other Telco products and services, push 2. If you are thinking about having a small business at your home, push 3. If you would like to order something, push 4. If you would like to know more about Maryland's new Area Codes, push 5." The announcement could go on to deal with multiple additional subjects.

One of the key features of the new system is to allow the customer at any time to push a key and go to a predesignated office where the Telco maintains a large Service Solution Center (SSC) staffed by over 100 people trained to pleasantly explain how features operate. Such a Service Solution Center installed by one regional Telco can be made available to other regional operating companies offering the opportunity to permit those companies to access the pre-existing Telco Solutions Center for pre-designated functions. If the customer pushes key 4 to order something, he/she is connected to the Network Center which has been set up to activate features on lines. This center performs an internal selling function and can add features to the customer's line immediately while the customer is on the line.

According to the invention the SAVS platform may also be utilized in similar cooperation with the ASAVP to provide service assurance verification. Thus following a customer complaint and after the problem has been repaired a call back to the subscriber is automatically initiated to report that the trouble has been repaired. This may be followed by the same options as described in connection with the service provisioning call. Thus the same architecture is used to effectuate the two different services. In the first instance the IVR functions of the SAVS processor 22 interface with the SOAC system to confirm service provisioning. In the second instance the IVR functions of the same SAVS processor interface with a module of the LMOS system to confirm service repair or give service assurance.

According to another feature of the invention the ASAVP platform 20 is connected to a LAN 24, such as the AT&T Star Server LAN, via a connection of the Datakit Network indicated at 28. The foregoing description has explained the automatic verification process in the instance where correct installation of the service can be confirmed by the ASAVP processor. In those instances where the attempted verification indicates a problem a message is sent to the LAN 24 via the data connection indicated at 28. Through the LAN 24 connection is made to host processor 26 and the systems indicated at 26 included in or under the control of the existing business office systems network. This may be referred to as customer related operations. These include SOAC, Billing and Order Support System (BOSS), Loop Maintenance and Operations System (LMOS), and Computer System for Mainframe Operations (COSMOS). SOAC is the service order system that issues service orders and actually maintains a copy of the current service order. BOSS is the business office service system containing account information. LMOS is the maintenance system that keeps track of cable paths. COSMOS is the central office record keeping system that keeps track of telephone numbers.

This connection to the business or service related systems is made through VTAM 25 which is a Virtual Terminal Access Method Network which permits connecting these various billing and service order functions together. It may be referred to as a business office network. Technical Network or operating functions indicated at 29 ( Central Offices, SCCS, BTT, MSS and RMAS) are connected to the Datakit Network at 28 to LAN 24. This may be called a technical network or operating network. In contrast to this technical network, the personnel connected with the customer related functions accessed by the VTAM network 25 are non-technical personnel who it is desired to isolate from the technical Datakit Network. This may be called the business office systems network sometimes referred to as VTAM. Likewise, it is desirable to provide isolation of the technical personnel accessing the technical side of the system in the Datakit Network from the VTAM or host side. The primary systems indicated at 26 in FIG. 2 are on the VTAM network.

When attempted verification or a customer complaint indicates a problem, the operator needs access to multiple systems and currently makes multiple connections to access these systems. According to the invention these multiple connections are obviated by providing common access to both the VTAM business system and Datakit operating or technical network via the LAN 24. This access to the business facilities on the one hand and the technical network facilities on the other hand permits not only identification of errors in installation, but also the virtually immediate correction of such errors. In order to eliminate multiple connections or calls to provide this functionality, a multiple window processor is provided. This is shown as an X-Window Manager at 30. Such a processor is available in a product called X-Links available from CSC/Intellicom and a subsidiary. Other equivalents to 386 or 486 processors using operating systems having windows may be utilized.

On detecting an error it is necessary to access multiple databases. According to the invention, this is accomplished via the X-Window Manager processor 30. This processor terminal provides access to the multiple separate databases and can automatically bring up on the screen the business and information from the business office databases such as COSMOS, LMOS and SOAC, as well as the technical information from the network side such as the CO switches, RCMAC or RMAS and the adjunct or multi-service platform switches. In addition to the foregoing, the terminal 30 has access to the databases in the ASAVP. The processor 30 is preferably operated in a multitasking mode. At this point the nature of the error can be ascertained. Thus the operator could see that Call Waiting is missing, by way of example, and then originate from the terminal 30 the necessary communications instructions to rectify the error. This provides the ability to provision, confirm, rectify and otherwise manipulate numerous services and functions. Following this identification and correction of the error, a signal is sent via the link 28 to the ASAVP which thereupon confirms the operation and availability of the service to the subscriber in the manner explained above.

Thus it will be seen that the invention provides a new support system using IVR technology to keep customers informed as services and features are activated on their lines. The system not only notifies customers as features are activated, but also provides educational information on the operation of features and allows for on-line transfers to a Service Solution Center and to a Network Center for additional sales. This permits completion of service provisioning with an informed and educated customer.

At predefined intervals, data is automatically downloaded from the Advanced Service Assurance Verification Platform to the SAVS database. SAVS contacts customers during the first day of their service being activated. At the same time customers are provided with instructional information on feature operation, and are provided opportunities to request information on new services and/or transfer to the Service Solution Center for help in setting up their services such as building their mailboxes. The system operates in a standard UNIX V or DOS environment using Apprentice Application software. The preferred hardware is an ATT/NCR Star Server LAN which is an integral unit which may be located in the RCMAC or any operations center. The system is directly or indirectly interfaced to the Service Order System, LMOS, GDS, MTAS, or ASAVP for access to outdialed data. The system is two-way, (i.e.) it contacts the customer at the completion of a service order or the customer or installer or the like may, at their convenience, dial into SAVS using a toll free 800 number.

The new system provides on-line real time verification of ordered services by matching of ordered services with those services and features provisioned in the central office switch. On the date due of the service order, the system accesses the central office switch through the Datakit Network and compares service order information with switch translation data. Discrepancies are displayed via the X Windowing terminal to operators who may make any needed corrections, thereby eliminating possible customer complaints. The types of discrepancies are summarized to provide a running record for review and appropriate changes in the provisioning process. Answer Call and MSP services are verified both in the central office switch and in the external adjunct processor. This processor may be of the type described in U.S. Pat. Nos. 5,012,511 and 5,060,255. Once services are verified as correct this information is provided to the SAVS system which completes the provisioning cycle by notifying the customer when services are activated.

The SAVS IVR platform 22 is connected to the local Telco corporate network 23 which is also on the Datakit Network. This provides multiple out-dial and in-dial ports on which calls may be dialed out and calls may come in. These ports may be utilized to call customers to provide instructions, notification, provide sales, directory assistance, and a sales and business office channel. Also connected to the network 23 is a printer 21 for printing postcards 27. According to the invention, when a pre-determined number of attempts have been made by the SAVS platform to confirm or authenticate the installation of service or correction of a complaint without completion, the authentication information is sent from the SAVS platform to the printer 21 which generates a postcard 27 which is mailed to the subscriber. The postcard provides the subscriber with the confirmation information and also advises the subscriber that instructions and other information is freely available by calling an identified toll free 800 number.

Figure 3:
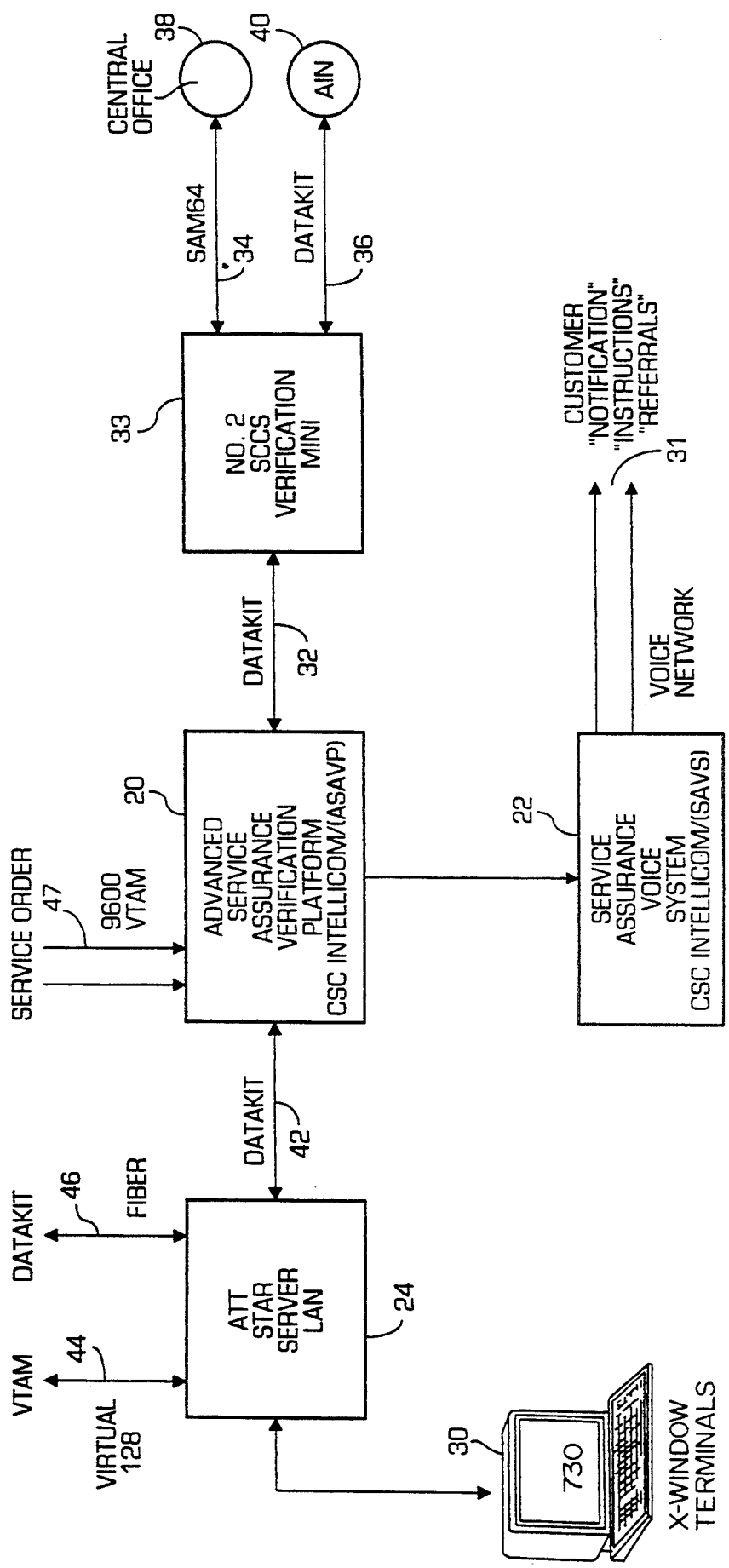
FIG. 3 is a simplified block diagram illustrating the system of the invention.

A simplified diagram of the architecture of the system is shown in FIG. 3. Referring to that figure the ASAVP 20 is connected to the SAVS platform 22 to provide the interactive voice services over the voice network indicated at 31. The ASAVP 20 is connected via the Datakit Network indicated at 32 to the Switching Control Center (SCCS) Verification processor. This is an existing processor which provides an access point to the central offices and to external processors and service platforms via Datakit links 34 and 36. The central offices are indicated diagrammatically at 38 and the external processors are indicated diagrammatically at 40. These may comprise one or more adjunct processors for providing such services as Answer Call, Voice Mail, Call Forwarding, and the like. Examples are shown in U.S. Pat. Nos. 5,012,511 and 5,060,255.

The ASAVP 20 is also connected by Datakit link 42 to the LAN and server 24. The LAN is connected to the VTAM network via a virtual link 44 and to the technical Datakit Network via link 46 which is preferably fiber. This link provides access to the maintenance and provisioning of the switches via the MACNET and RMAS. The LAN 28 is in turn connected to the X Window terminal 30 which may be physically located at the RCMAC or at any other convenient location. The terminal 30 provides simultaneous access to the VTAM accessed business functions such as SOAC, BOSS, LMOS, and COSMOS as well as the technical Datakit accessible functions such as the central office switches, MACNET, RMAS and adjunct processors. The service order network is connected to the ASAVP platform via the VTAM network indicated at 47.

Figure 4:
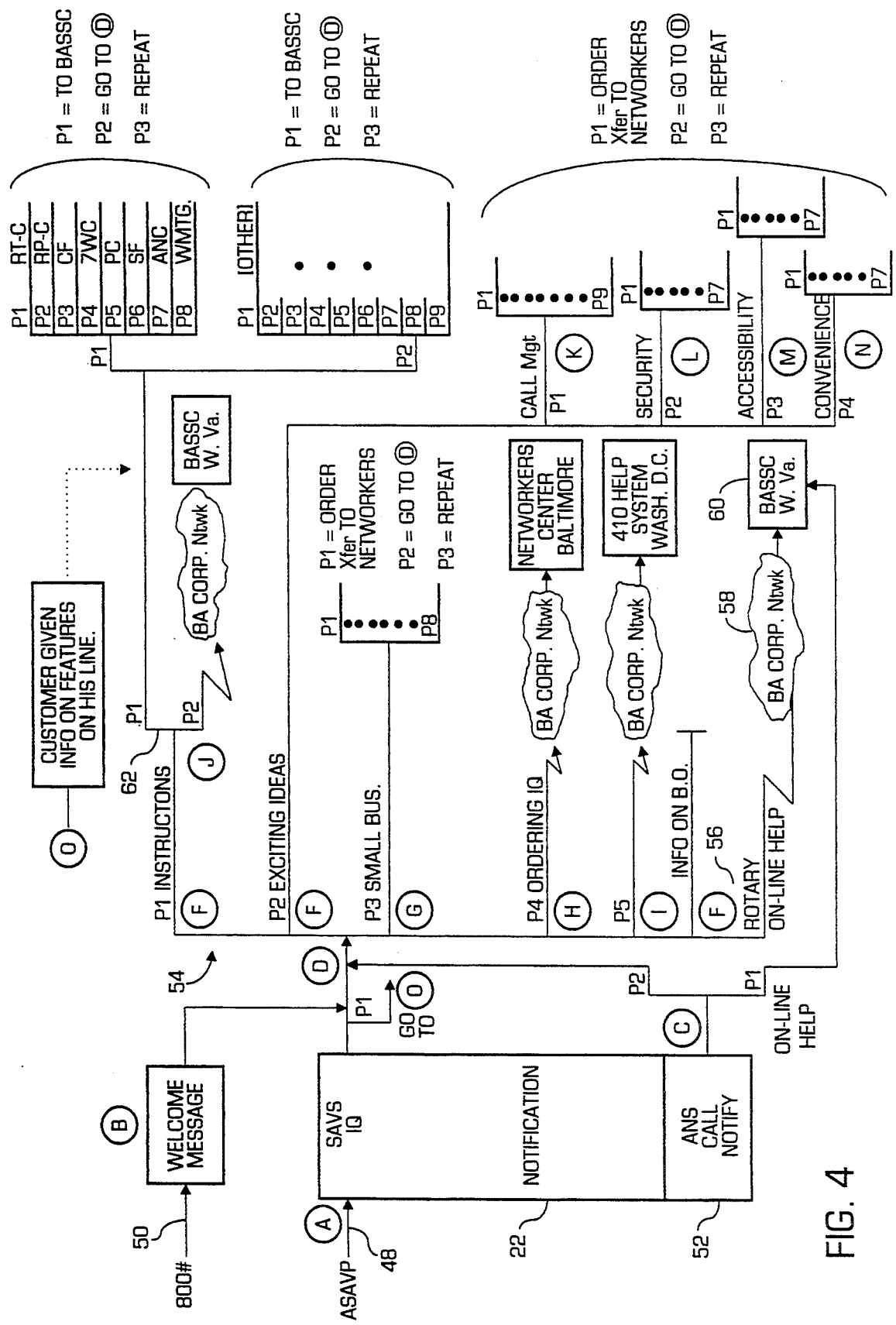
FIG. 4 is a diagram of a menu illustrating the dialogue provided by the interactive voice platform according to the invention.

Referring to FIG. 4 there is shown a self-explanatory graphic menuing diagram illustrating the voice menus and functions provided by the SAVS IVR platform. The SAVS platform is indicated generally at 22 receiving input from the ASAVP at 48. The toll free 800 line associated with the postcard 27 (FIG. 2) is indicated at 50. This serves not only the previously described function, but also permits anyone to obtain instructions as indicated following the arrow P1 presently to be described. Access to the SAVS voice system via the toll free line is indicated at 50 and connection to the ASAVP platform is indicated at 48. The general notification functions are indicated at 22 and an exemplary verification, as for Answer Call, is indicated diagrammatically at 52. The SAVS platform provides the main menu at 54.

A typical dialogue may be as follows:

"This is the Telco IQ Services Information Line. If you would like instructions on how to operate Telco IQ services, please press 1 (P1). If you would like to hear more about how IQ services can help make your life easier, please press 2 (P2). If you would like to learn more about how our IQ services can improve your small business services, please press 3 (P3). If you would like to order any of our IQ services, please press 4 (P4). If you would like more information on Maryland's new area code 410, please press 5 (P5). If you have questions concerning your telephone bill, please contact your local telephone company business office. The telephone number can be found on your monthly telephone bill or in your telephone directory. If you are calling from a rotary phone, please hold and a Bell Atlantic representative will assist you." (56)

At this point the user, by way of example, presses 1 and the announcement continues: "To hear operating instructions for Return Call (RT-C), Repeat Call (RF-C), Call Forwarding (CF), 3-Way Calling (TWC), Priority Call (PC), Collect Forward (SF), Answer Call (ANC) or optional wire maintenance (WWMTG) press 1." At this time 1 is pressed, by way of illustration, and the announcement continues:

"Press 1 for Return Call. Press 2 for Repeat Call. Press 3 for Call Forwarding. At this time 3 is pressed, by way of illustration, and the announcement continues:

"Call Forwarding lets you transfer your incoming calls to another location. To activate Call Forwarding simply pick up the telephone, press 72# and listen for a dial tone. Then dial the number to which you would like your calls transferred. The called number will ring. When answered tell the party that your call will be forwarded to that number. You must maintain the connection for at least 6 seconds for Call Forwarding to become effective. Then hang up. Call Forwarding is in effect. If you try to set up Call Forwarding and there is no answer or the line is busy you can still forward your calls. Just hang up and immediately repeat the process from the beginning. When you hear two short tones (beep, beep) followed by a dial tone the service is in effect. In some areas you will not receive a dial tone. No answer is necessary on the second attempt. To deactivate Call Forwarding simply pick up the receiver and press 73#. You will hear two short tones to confirm that Call Forwarding is deactivated. Remember, Call Forwarding must be activated and deactivated from the phone that is forwarding the call. Press 1 if you want a representative to help you. Press 2 to return to the main menu. Thank you." At this point in the sub-menu, 1 (P1) is pressed, by way of example, and the announcement continues:

"Please hold while your call is being connected." The call is then connected to the Service solution Center and a live operator continues the dialogue: "Thank you for calling Telco Services System. How may I help you?"

The remainder of the illustrative functionality of the IVR dialogue is believed self-explanatory from FIG. 4 and the legends thereon.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. In a telecommunications system having a plurality of switches interconnected by trunks, a plurality of subscriber stations arranged in groups with each group being served by one of said switches, a plurality of subscriber lines connecting each switch with the group of subscriber stations served thereby, at least one of said switches including means for providing special services to subscriber stations served thereby and said at least one switch being associated with a first adjunct processor adapted to receive data, a first processor associated with said at least one switch and adapted to generate recent change signals that program switch translation variables in said at least one switch, a first data network dedicated to system control associated with said first processor, said plurality of switches and said first adjunct processor; a second data network dedicated to performing business functions responsive to a service order, the improvement comprising:

(a) an interactive voice processor (IVP) connectable to said at least one switch and said subscriber lines;

(b) a Local Area Network (LAN) connected via the first data network to said at least one switch, said first processor, and said first adjunct processor and said second data network;

(c) a second adjunct processor connected to receive from said at least one switch data representative of a special service ordered from said special services in accordance with said service order and that is to be implemented by said least one switch, said second adjunct processor also being connected to said IVP and said LAN;

(d) a second processor connected to said LAN to enable said second processor to access said first and second data networks and data bases connected to said LAN;

(e) said second adjunct processor being responsive to said data from said at least one switch representative of said special service ordered to be implemented by said at least one switch to provide signals to said IVP and also to provide signals to said LAN;

(f) said IVP being responsive to the signals from said second adjunct processor to initiate connection to a subscriber line designated to receive said special service ordered and delivering to said designated subscriber line voice message confirmation of implementation of said special service ordered;

(g) said second processor being arranged to access and display data representative of said special service ordered and data representative of said special service ordered as delivered to said at least one switch and said first adjunct processor, said second processor having an input terminal for receiving input effective to change the data provided to at least one of said at least one switch and said first adjunct processor.

2. A telecommunications system according to claim 1 including a service center having multiple operator terminals, wherein said voice message confirmation provided to said designated subscriber line includes an option for connecting to said service center.

3. A telecommunications system according to claim 2, wherein said telecommunications system provides access to said service center via a toll free 800 number.

4. A telecommunications system according to claim 1 including a printer associated with said IVP, wherein said IVP, upon encountering inability to complete said confirmation to a subscriber, activates said printer to produce documentary confirmation for transmittal to the subscriber.

5. A telecommunications system according to claim 1 wherein said voice message confirmation also includes at least one voice message offering multiple options to provide additional information for a subscriber, and said IVP includes means for delivering said information to said subscriber.

6. A telecommunications system according to claim 1 wherein said second data network comprises a Virtual Terminal Access Method (VTAM) network.

7. A telecommunications system according to claim 1 wherein said second processor comprises a sub-system operating with a window type multitasking system.

8. In a telecommunications system having a plurality of switches interconnected by trunks, a plurality of subscriber stations arranged in groups with each group being served by one of said switches, a plurality of subscriber lines connecting each switch with the group of subscriber stations served thereby, at least one of said switches including means for providing special services to subscriber stations served thereby and said at least one of said switches being associated with a first adjunct processor, a first processor associated with said at least one switch and adapted to generate recent change signals that program switch translation variables in said at least one switch, a first data network associated with said first processor, said switch and said first adjunct processor; a second data network dedicated to performing business functions responsive to a service order, a method comprising the steps of:
- (a) receiving at a second adjunct processor first data representative of changes necessary to provide special services requested by a subscriber where said first data is transmitted from said second data network;
- (b) receiving at said second adjunct processor second data representative of changes inputted to said at least one switch where said second data is transmitted from said at least one switch;
- (c) comparing said first and second data received in steps (a) and (b);
- (d) responsive to correspondence between said first and second data transmitting a signal to an interactive voice processor (IVP);
- (e) connecting said IVP to a subscriber line of said subscriber requesting said special services and transmitting voice message confirmation of installation of said special services;
- (f) responsive to lack of correspondence between said first and second data received in steps (a) and (b) transmitting to a second processor a signal representative of said first and second data received in steps (a) and (b); and
- (g) initiating from said second processor signals to rectify said lack of correspondence.

9. A method according to claim 8, wherein said step (g) comprises the step of correcting said lack of correspondence, the method further comprising the step of connecting said IVP to said subscriber line and transmitting confirmation of availability of the service in response to said correcting step.

10. In a telecommunications system having a plurality of switches interconnected by trunks, a plurality of subscriber stations arranged in groups with each group being served by one of said switches, a plurality of subscriber lines connecting each switch with the group of subscriber stations served thereby, at least one of said switches including means for providing special services to subscriber stations served thereby and being associated with a first adjunct processor, a first processor associated with said at least one switch and adapted to generate recent change signals that program switch translation variables in said at least one switch, a first data network associated with said first processor, said switch and said first adjunct processor; a second data network dedicated to performing business functions responsive to a service order, a method comprising the steps of:
- (a) receiving at a second adjunct processor first data representative of changes necessary to provide special services requested by a subscriber where said first data is transmitted from said second data network;
- (b) receiving at said second adjunct processor second data representative of changes inputted to said switch where said second data is transmitted from said at least one switch;
- (c) comparing said first and second data received in steps (a) and (b);
- (d) responsive to correspondence between said first and second data transmitting a signal to an interactive voice processor (IVP);
- (e) attempting to connect said IVP to a subscriber line of said subscriber requesting special services; and
- (f) following connection to said subscriber line of said requesting subscriber transmitting voice message confirmation of installation of said requested special services in response to said signal transmitted to said IVP.

11. A method according to claim 10 including the steps of:
- (a) responsive to lack of correspondence between said first and second data received pursuant to steps (a) and (b) transmitting to a second processor a signal representative of said first and second data received in steps (a) and (b); and
- (b) initiating at said second processor signals to rectify said lack of correspondence.

12. A method according to claim 10 including the steps of:
- (a) preparing documentary confirmation of the installation of said requested special services; and
- (b) transmitting said documentary confirmation to said requesting subscriber.

13. A method according to claim 10 including the step of connecting the requesting subscriber to an operator at an operator service center of said telecommunications system.

14. A method according to claim 12 including a step of enabling the requesting subscriber to access an operator at an operator service center via toll free number in accordance with said transmitted documentary confirmation.

15. A method according to claim 10 including a step of transmitting from said IVP to the subscriber line of the requesting subscriber a voice message describing an option to establish connection to an operator.

16. In a telecommunications system having a plurality of switches interconnected by trunks, a plurality of subscriber stations arranged in groups with each group being served by one of said switches, a plurality of subscriber lines connecting each switch with the group of subscriber stations served thereby, at least one of said switches including means for providing special services to the group of subscriber stations served thereby and being associated with a first adjunct processor, a first processor associated with said at least one switch and adapted to generate recent change signals that program switch translation variables in said at least one switch and said first adjunct processor; a data network directed to performing business functions responsive to a service order, the improvement comprising:
- (a) an interactive voice processor (IVP) connectable to said at least one switch and said subscriber lines;
- (b) a second adjunct processor connected to receive from said at least one switch first data representative of one of said special services ordered to be implemented in said at least one switch, said second adjunct processor also connected to said IVP;
- (c) said second adjunct processor, responsive to second data representative of said one of said special services as implemented by said at least one switch, providing signals to said IVP representative of a comparison between said first and second data; and
- (d) said IVP being responsive to said signals from said second adjunct processor to initiate connection to a subscriber line designated to receive said one of said special services ordered and delivering to said designated subscriber line voice message confirmation of the implementation of said one of said special services ordered.

17. In a telecommunications system having a plurality of switches interconnected by trunks, a plurality of subscriber stations arranged in groups with each group being served by one of said switches, a plurality of subscriber lines connecting each switch with the group of subscriber stations served thereby, at least one of said switches including means for providing special services to subscriber stations served thereby and said at least one switch being associated with a first adjunct processor that receives data, a first processor associated with said at least one switch and adapted to generate recent change signals that program switch translation variables in said at least one switch, a first data network associated with said first processor, said at least one switch and said first adjunct processor; a second data network dedicated to performing business functions responsive to a service order, the improvement comprising:

(a) an interactive voice processor (IVP) connectable to said at least one switch and said subscriber lines;

(b) a Local Area Network (LAN) connected via said first data network to said at least one switch, said first processor, said first adjunct processor and said second data network;

(c) a second adjunct processor connected to receive from said switch data representative of a special service ordered from said special services in accordance with said service order and that is to be implemented by said at least one switch, said second adjunct processor also connected to said IVP and said LAN;

(d) a second processor connected to said LAN for accessing said first and second data networks and databases connected to said LAN;

(e) said second adjunct processor being responsive to said data representative of said special service ordered to provide signals to said IVP, and also to provide signals to said LAN; and (f) said second processor being arranged to access and display first data representative of the special service ordered and second data representative of said special service ordered as delivered to said at least one switch and said first adjunct processor, said second processor having input terminals for receiving input effective to change the data provided to at least one of said at least one switch and said first adjunct processor.

18. A telecommunications system according to claim 17 wherein said IVP responsive to said signals from said second adjunct processor initiates connection to a subscriber line designated to receive said special service ordered and delivers thereto voice message confirmation of implementation of said special service ordered.

19. A telecommunications system according to claim 17 further including a printer, and wherein said IVP responsive to said signals from said second adjunct processor attempts to establish a connection with a subscriber line designated to receive said special service ordered, and on failure to establish such connection transmits to said printer signals causing said printer to produce documentary confirmation of installation of said special service ordered for transmittal to a subscriber.

20. A telecommunications system according to claim 19 further including a service center having multiple operator terminals, wherein said IVP, during said established connection, provides to the subscriber line an option for connection to said service center.

21. A telecommunications system according to claim 20, wherein said telecommunications system provides access to said service center via a toll free 800 number.

* * * * *